US010814608B2

(12) United States Patent
Jaiswal et al.

(10) Patent No.: US 10,814,608 B2
(45) Date of Patent: Oct. 27, 2020

(54) GENERATING THREE-DIMENSIONAL OBJECTS AND GENERATING IMAGES ON SUBSTRATES

(71) Applicant: HEWLETT-PACKARD DEVELOPMENT COMPANY, L.P., Houston, TX (US)

(72) Inventors: Megha Jaiswal, Bangalore (IN); Rishi Sharma, Bangalore (IN); Sanket Naik, Bangalore (IN); Fernando Juan, Sant Cugat del Valles (ES); Edward Dale Davis, Poway, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 533 days.

(21) Appl. No.: 15/507,033

(22) PCT Filed: Nov. 6, 2014

(86) PCT No.: PCT/US2014/064308
§ 371 (c)(1),
(2) Date: Feb. 27, 2017

(87) PCT Pub. No.: WO2016/053364
PCT Pub. Date: Apr. 7, 2016

(65) Prior Publication Data
US 2017/0246806 A1    Aug. 31, 2017

(30) Foreign Application Priority Data

Sep. 29, 2014  (IN) .......................... 4850/CHE/2014

(51) Int. Cl.
*B29C 67/00*        (2017.01)
*B33Y 10/00*        (2015.01)
(Continued)

(52) U.S. Cl.
CPC ............ *B33Y 50/02* (2014.12); *B29C 64/153* (2017.08); *B29C 64/165* (2017.08);
(Continued)

(58) Field of Classification Search
CPC ..... B29C 64/40; B29C 64/386; B29C 64/153; B29C 64/165; B33Y 50/02; B33Y 10/00; B33Y 30/00
See application file for complete search history.

(56) References Cited

U.S. PATENT DOCUMENTS

| 5,204,055 A | 4/1993 | Sachs et al. |
| 5,424,801 A | 6/1995 | Lo et al. |

(Continued)

FOREIGN PATENT DOCUMENTS

| TW | I253379 | 4/2006 |
| TW | 201236883 A | 9/2012 |

OTHER PUBLICATIONS

Michael Molitch-Hou; Why-to 3D Print—3D Printing Beginner's Guide; Apr. 24, 2014; http://3dprintingindustry.com/2014/04/24/3d-print/.

*Primary Examiner* — Joseph S Del Sole
*Assistant Examiner* — Mohamed K Ahmed Ali
(74) *Attorney, Agent, or Firm* — HP Inc. Patent Department

(57) ABSTRACT

A printing system may be provided. The printing system may include an agent distributor to selectively deliver at least one printing agent onto a substrate on a first type of supply module and a layer of build material on a second type of supply module. The printing system may include a controller to control the agent distributor to selectively deliver the at least one printing agent in patterns derived (Continued)

from data representing a slice of a three-dimensional object to be generated and representing an image to be generated on the substrate.

17 Claims, 8 Drawing Sheets

(51) Int. Cl.
    *B33Y 30/00* (2015.01)
    *B33Y 50/02* (2015.01)
    *B29C 64/153* (2017.01)
    *B29C 64/165* (2017.01)
    *B29C 64/40* (2017.01)
    *B29C 64/386* (2017.01)

(52) U.S. Cl.
    CPC ............ *B29C 64/386* (2017.08); *B29C 64/40* (2017.08); *B33Y 10/00* (2014.12); *B33Y 30/00* (2014.12)

(56) References Cited

U.S. PATENT DOCUMENTS

| | | | |
|---|---|---|---|
| 6,936,212 | B1 | 8/2005 | Crawford |
| 7,261,542 | B2 | 8/2007 | Hickerson et al. |
| 7,686,995 | B2 | 3/2010 | Davidson et al. |
| 7,833,001 | B2 | 11/2010 | Silverbrook |
| 2002/0145213 | A1 | 10/2002 | Liu et al. |
| 2002/0149137 | A1* | 10/2002 | Jang ...................... G03F 7/0037 |
| | | | 264/494 |
| 2007/0063372 | A1 | 3/2007 | Nielsen et al. |
| 2007/0075460 | A1 | 4/2007 | Wahlstrom et al. |
| 2011/0076438 | A1 | 3/2011 | Farr et al. |
| 2012/0164256 | A1 | 6/2012 | Swanson et al. |
| 2013/0193619 | A1* | 8/2013 | Church ................. B29C 64/106 |
| | | | 264/400 |
| 2013/0241095 | A1 | 9/2013 | Korten et al. |
| 2013/0316081 | A1 | 11/2013 | Kovalcik et al. |
| 2014/0191439 | A1 | 7/2014 | Davis |
| 2016/0318251 | A1* | 11/2016 | Ederer ................. B29C 64/165 |
| 2017/0217098 | A1* | 8/2017 | Hartmann ............ B22F 3/1055 |

* cited by examiner

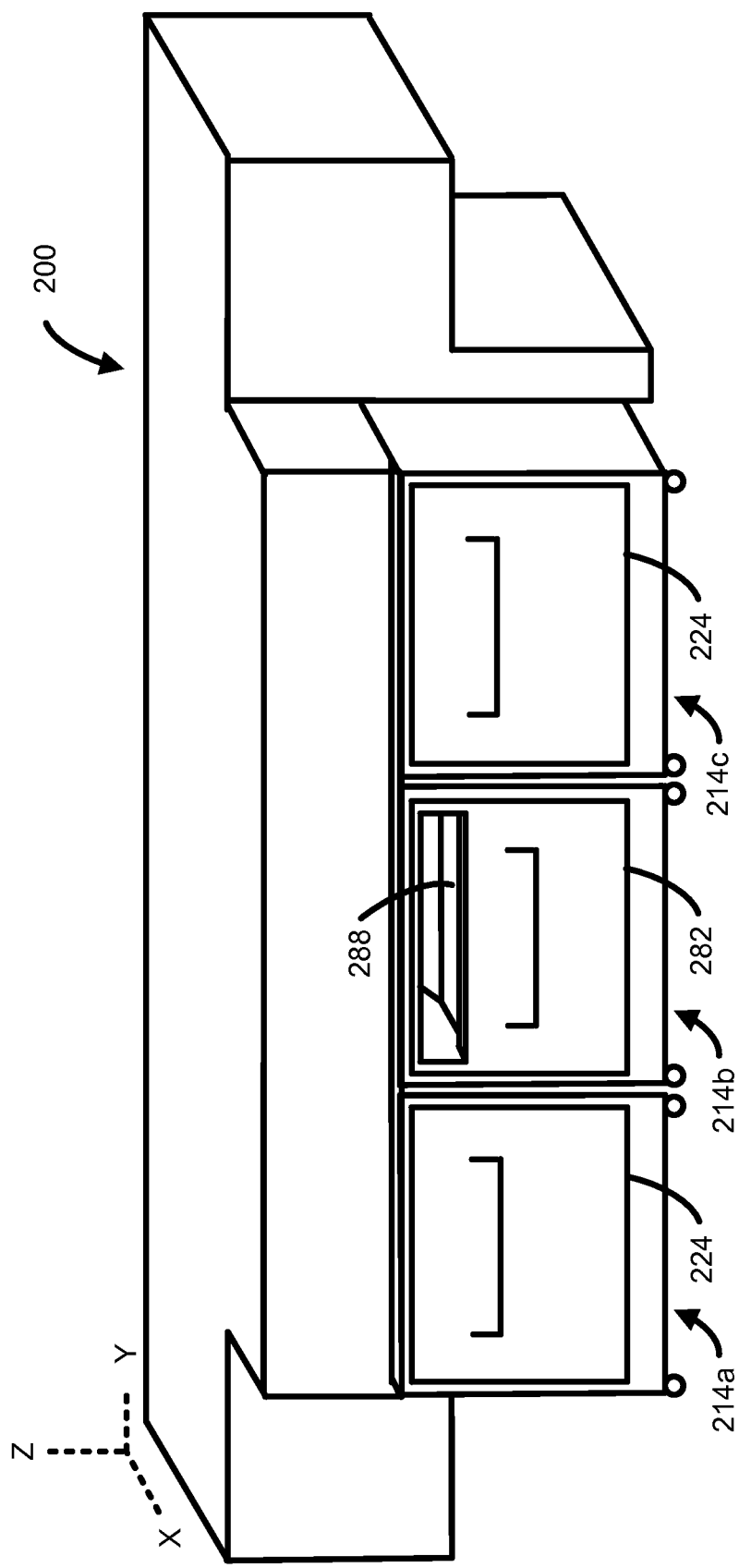

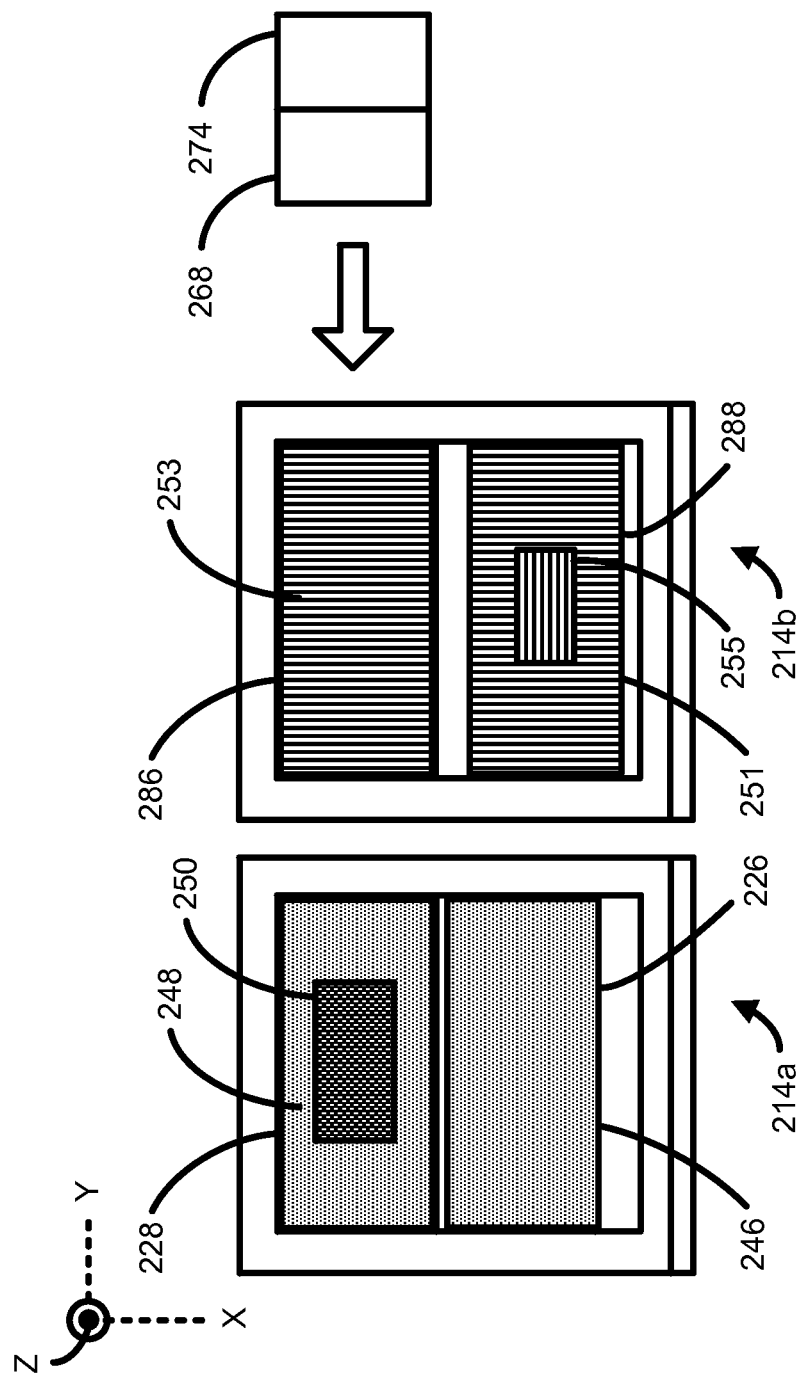

GENERATING THREE-DIMENSIONAL OBJECTS AND GENERATING IMAGES ON SUBSTRATES

BACKGROUND

Additive manufacturing systems that generate three-dimensional objects on a layer-by-layer basis have been proposed as a potentially convenient way to produce three-dimensional objects in small quantities.

The quality of objects produced by such systems may vary widely depending on the type of additive manufacturing technology used. Generally, low quality and low strength objects may be producible using lower cost systems, whereas high quality and high-strength objects may be producible using higher cost systems.

BRIEF DESCRIPTION

Some examples are described with respect to the following figures:

FIGS. 1a and 1c each are a simplified schematic diagram of a supply module for generating a three-dimensional object according to some examples;

Figure 2A:
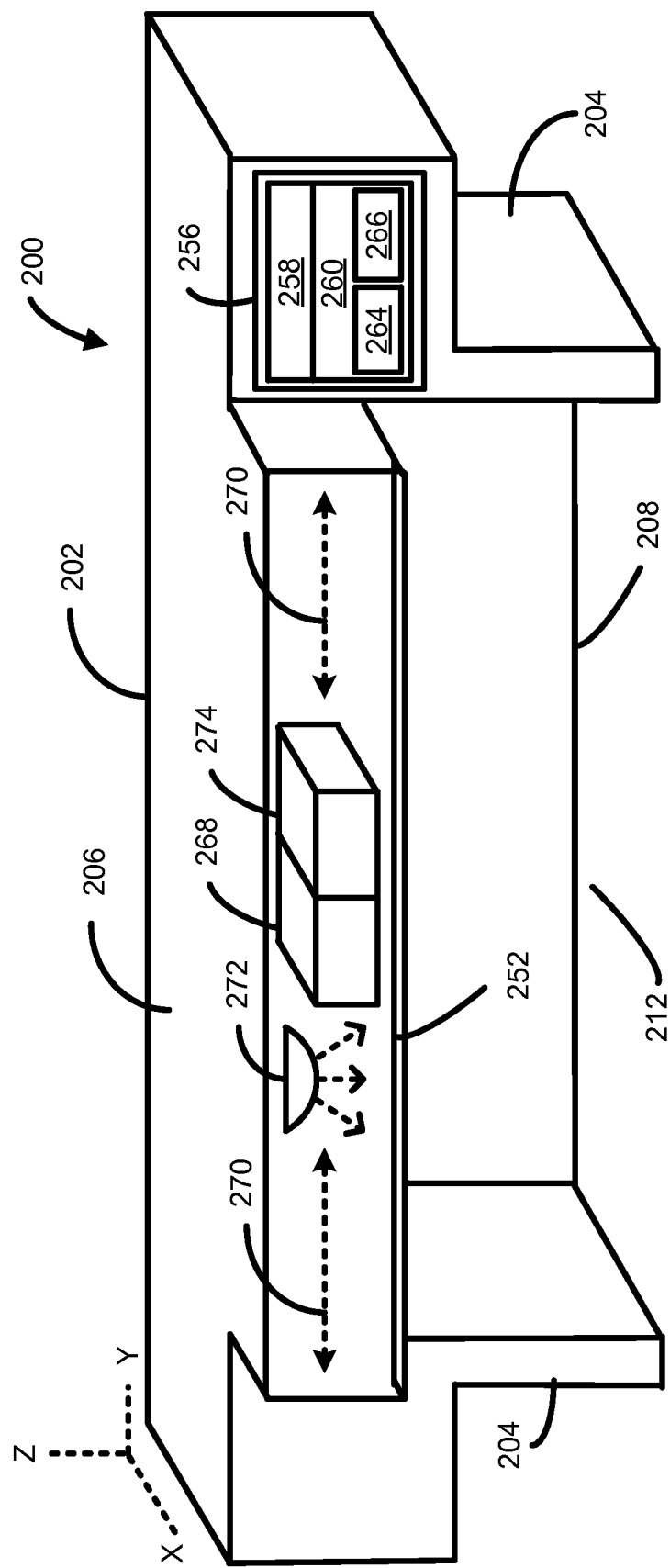
FIG. 2a is a simplified perspective view of a system according to some examples.
Figure 2B:
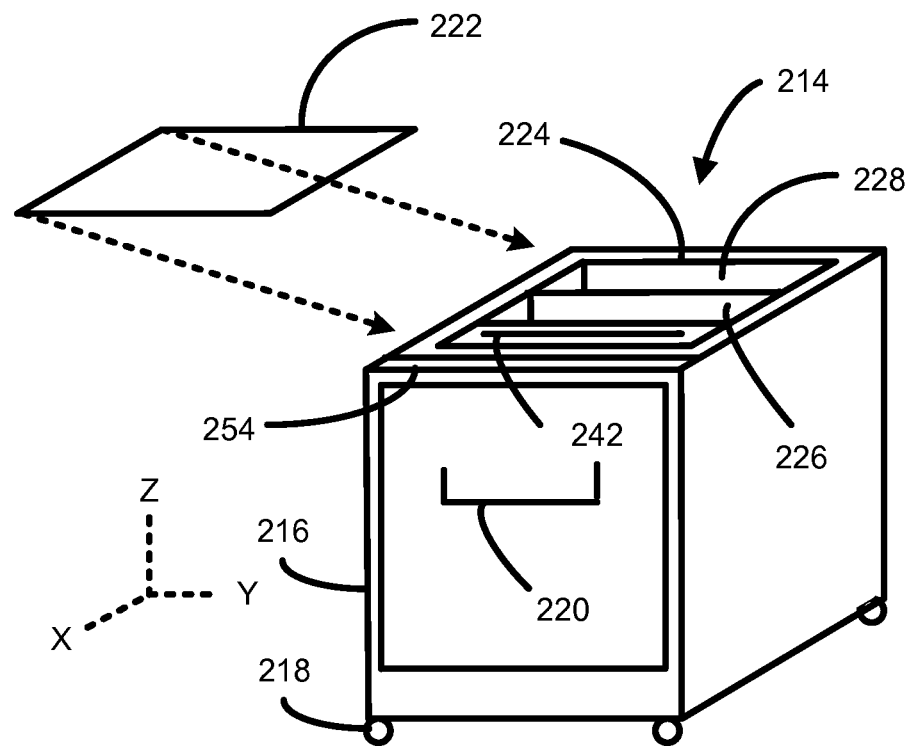
Figure 2C:
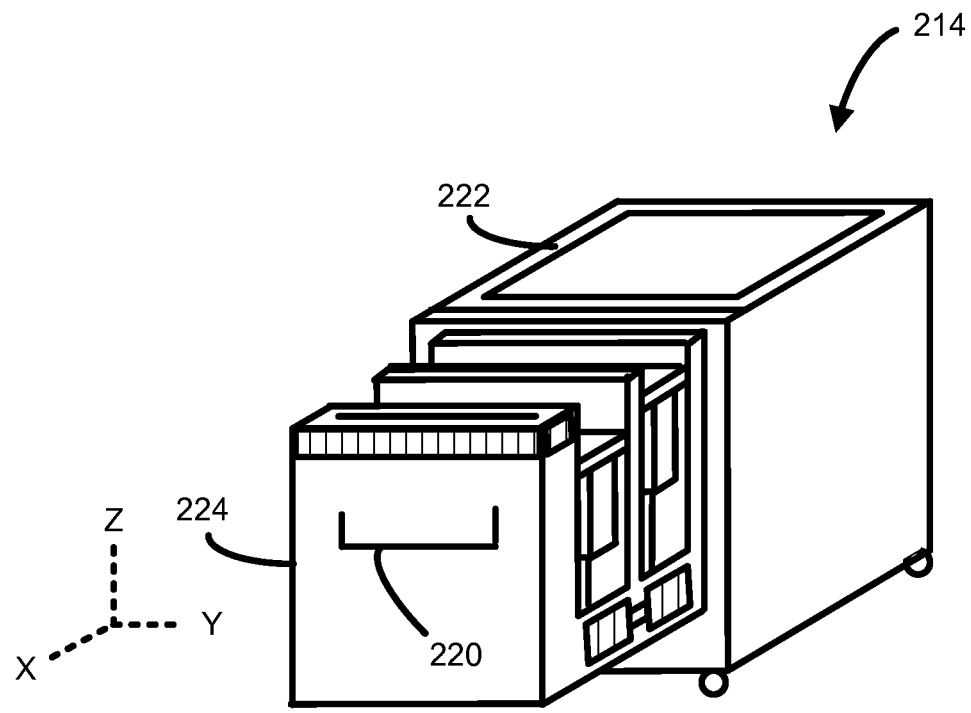
Figure 2D:
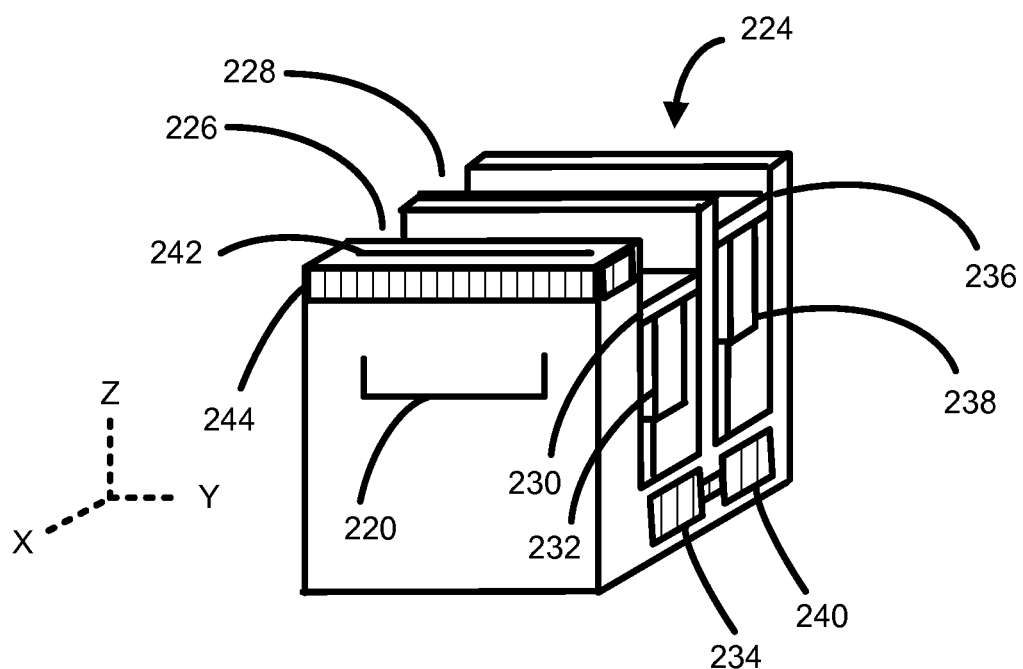
Figure 2E:
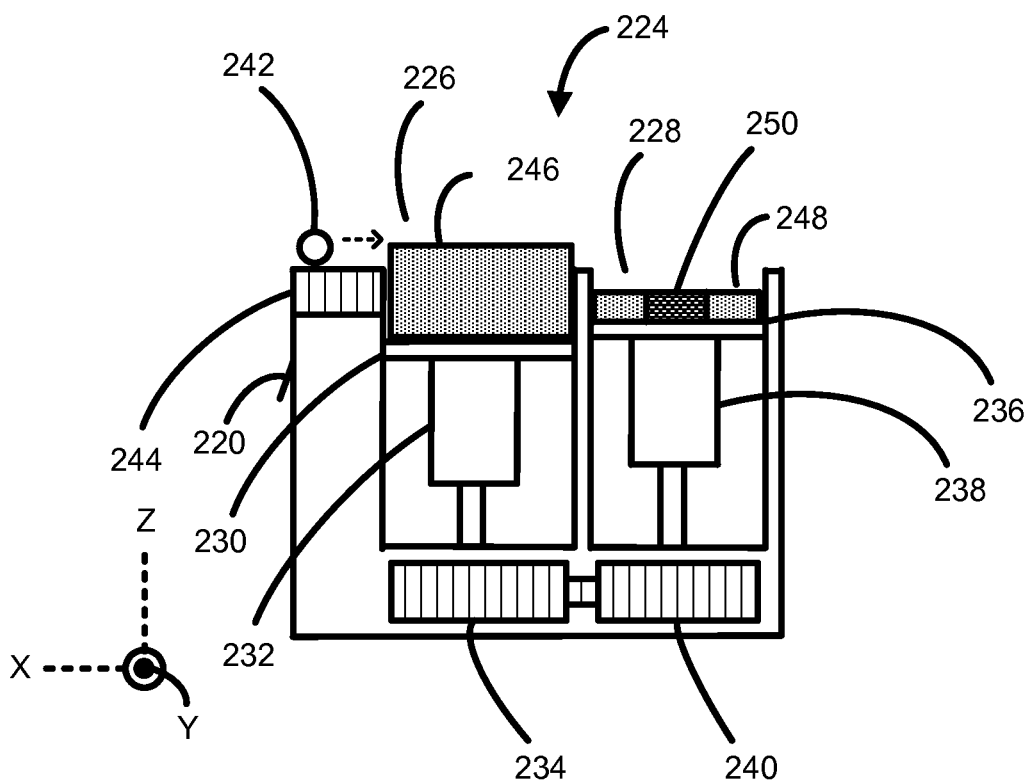
Figure 2F:
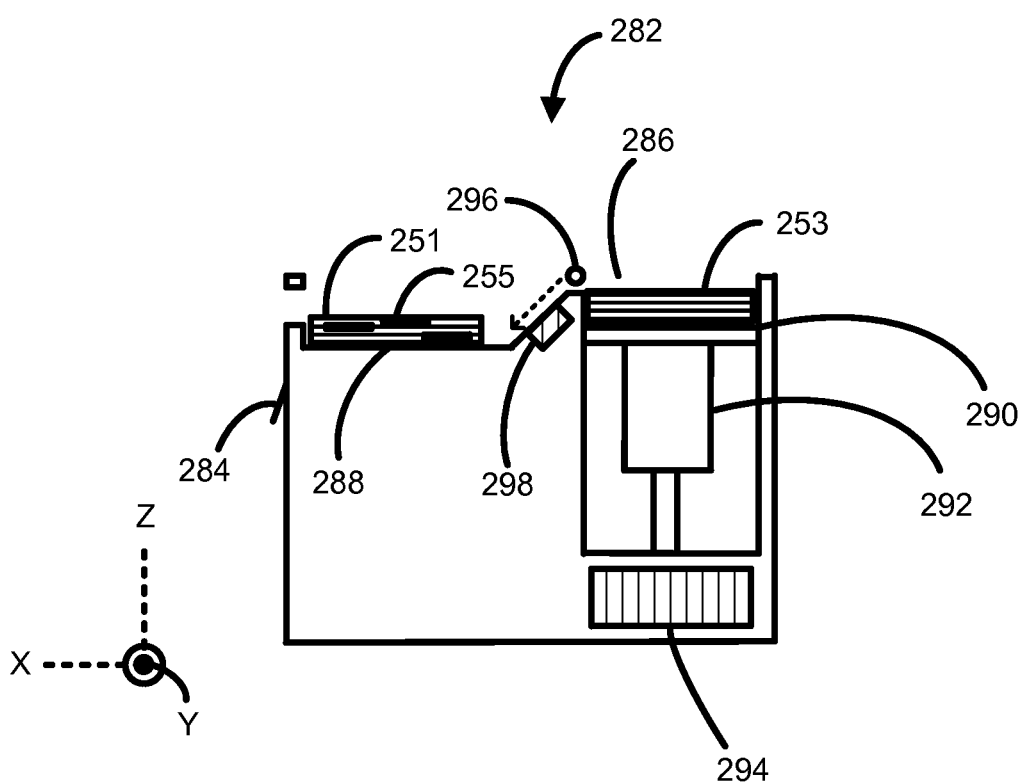
Figure 3:
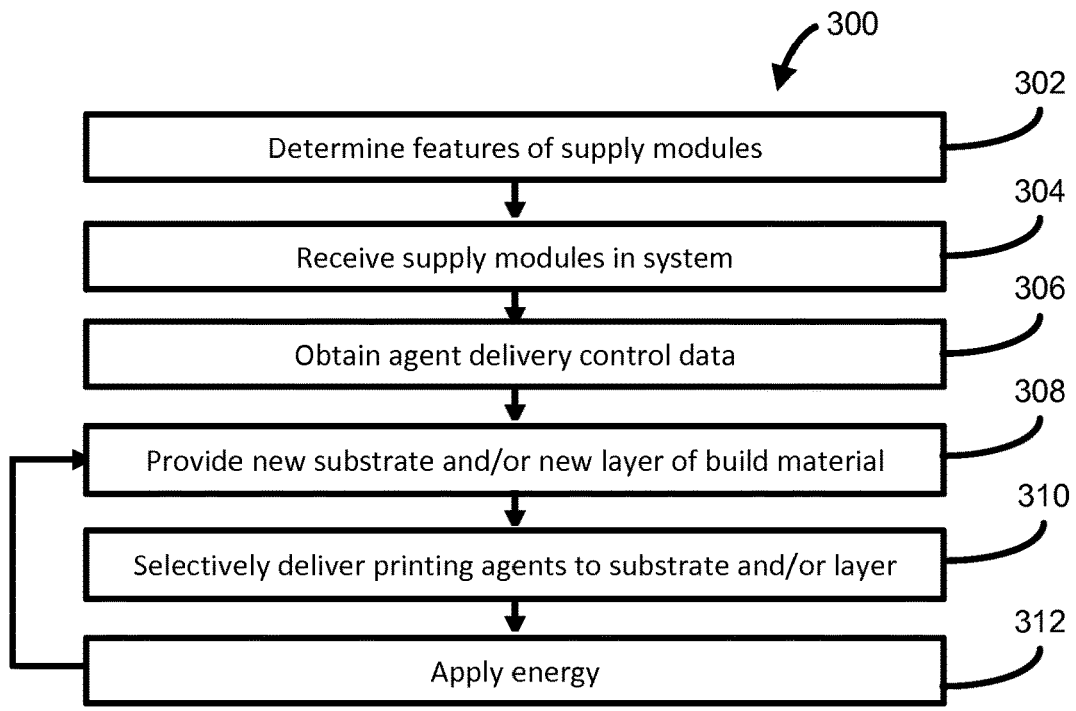
Figure 4A:
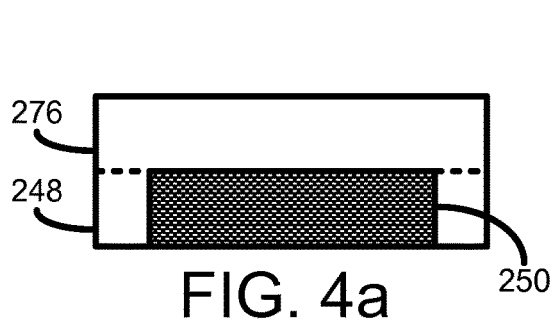
Figure 4C:
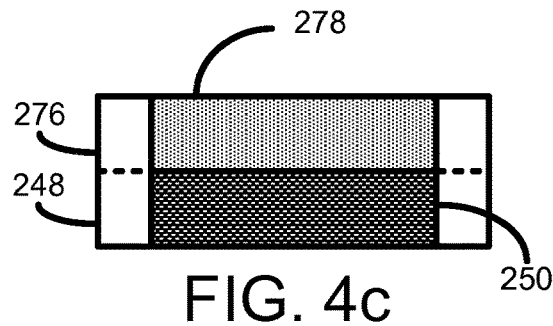
Figure 4B:
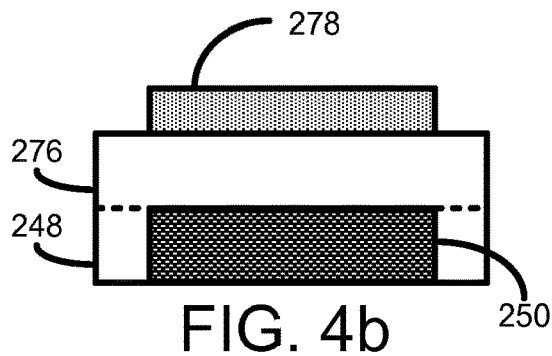
Figure 4D:
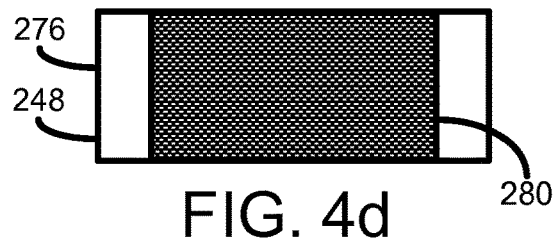
Figure 5A:
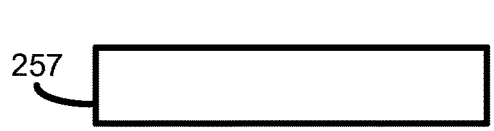
Figure 5B:
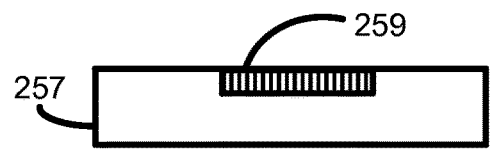

FIG. 2b-c are simplified perspective views of removable supply modules for a printing system according to some examples;

FIG. 2d is a simplified perspective view of a supply assembly of a supply module according to some examples;

FIG. 2e-f are simplified side views of supply assemblies of supply modules according to some examples;

FIG. 2g is a simplified perspective view of the printing system having received removable supply modules according to some examples;

FIG. 2h is a simplified overhead view of the removable supply modules and agent distributors according to some examples;

FIG. 3 is a flow diagram illustrating a method of generating a three-dimensional object and generating an image on a substrate according to some examples;

FIGS. 4a-d show a series of cross-sectional side views of layers of build material according to some examples; and FIGS. 5a-b show a series of cross-sectional side views of substrates according to some examples; and

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Some additive manufacturing systems generate three-dimensional objects through the solidification of portions of successive layers of build material, such as a powdered or liquid build material. The properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In yet other examples, other methods of solidification may be used, for example fused deposition modeling (FDM), selective laser sintering (SLS), light polymerization, among others.

Some two-dimensional printing systems may deposit printing agents on suitable substrates to generate images on the substrates. The substrates may be flexible or rigid. The substrates may have any thickness. The two-dimensional printing system may include an inkjet printer, such as a thermal inkjet printer or piezo inkjet printer, a laser printer, or any other printer suitable for printing on a substrate. Various printing agents may be used, including for example fluids such as inkjet inks. However, other types of printing agents may be used.

The present disclosure provides a system which may be to generate both three-dimensional objects as well to generate printed images on substrates. In some examples, the system may include a modular design wherein supply modules may be removably insertable into the system. The modular design may, for example, provide versatility by allowing supply modules to be inserted that may allow for generating, in a supply module, a three-dimensional object using build material, or an image on a substrate. In some examples, different types of supply modules to be inserted such one module may be for generating a three-dimensional object, and another module may be for generating an image on a substrate. Additionally, different sizes and/or multiple supply modules may be used in the system at the same time. The supply modules may also be easily insertable and removable to and from a printing system. Thus, the modular design may also enable high productivity by allowing faster use and fewer interruptions in continued use of the system, for example allowing successive print jobs to be completed with little or no time delays in between.

Figure 1A:
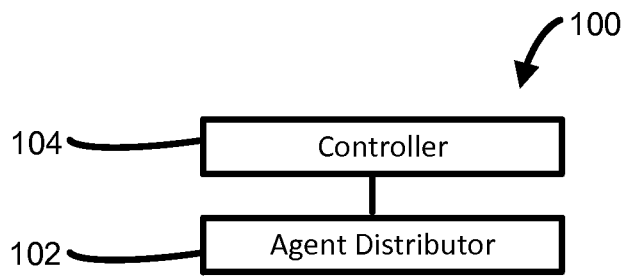
FIG. 1b is a flow diagram illustrating a method according to some example.

FIG. 1a is a simplified schematic diagram of a printing system 100 according to some examples. The printing system 100 may include an agent distributor 102 to selectively deliver at least one printing agent onto a substrate on a first type of supply module and a layer of build material on a second type of supply module. The printing system 100 may include a controller 104 to control the agent distributor 102 to selectively deliver the at least one printing agent in patterns derived from data representing a slice of a three-dimensional object to be generated and representing an image to be generated on the substrate. The "first type of supply module" and "the second type of supply module" may each either be a removable module or may be an integral part of the printing system 100.

Figure 1B:
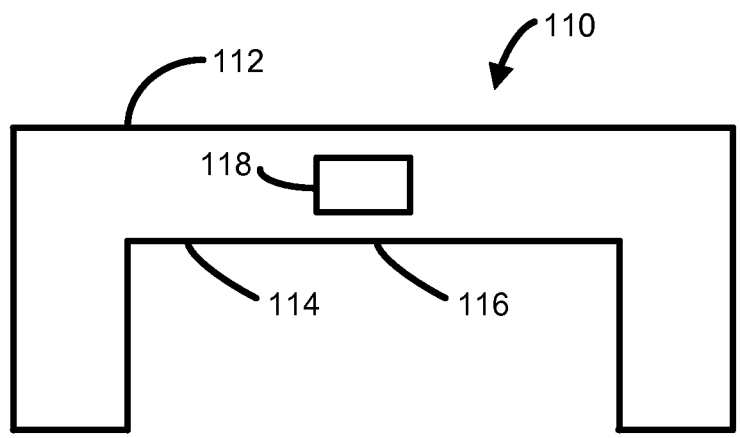

FIG. 1b is a simplified schematic of a printing system 110 according to some examples. The printing system 110 may include a housing 112 having a surface 114 defining a receiving volume 116 to removably receive first and second types of supply modules. The printing system 110 may include a controller 118 to control the printing system 110 to generate a three-dimensional object in the first type of supply module and to generate an image on a substrate in the second type of supply module.

Figure 1C:
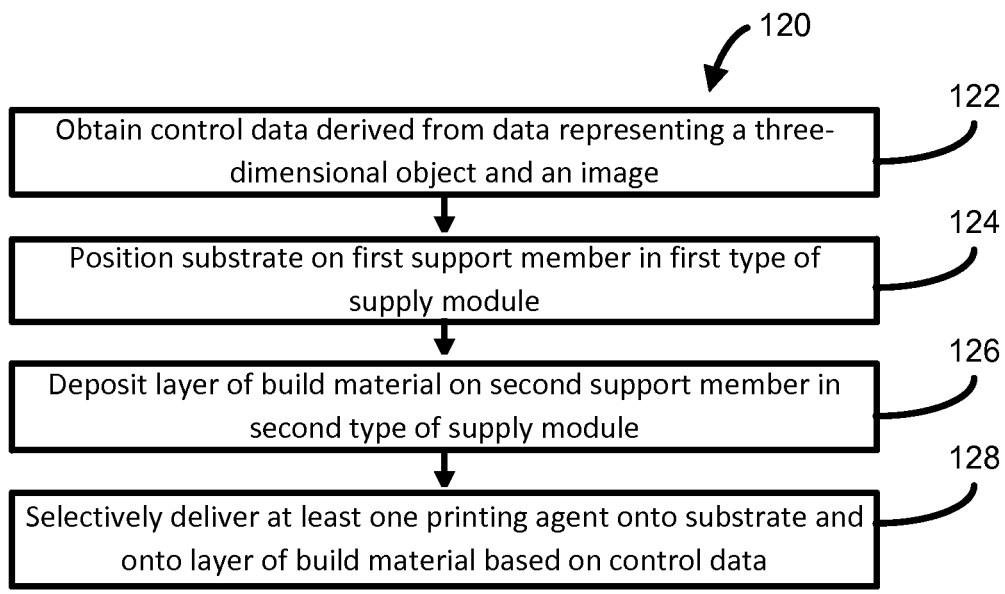

FIG. 1c is a flow diagram illustrating a method 120 according to some examples. In some examples, the orderings of the elements may be varied, some elements may occur simultaneously, some elements may be added, and/or some elements may be omitted. At 122, control data derived from data representing a three-dimensional object to be generated and an image to be generated may be obtained. At 124, a substrate may be positioned on a first support member in a first type of supply module in a printing system. At 126, a layer of build material may be deposited on a second support member in a second type of supply module in the printing system. At 128, using an agent distributor, at least one printing agent may be selectively delivered onto the substrate in a first pattern based on the control data and onto the layer of build material in a second pattern based on the control data.

FIG. 2a is a simplified perspective view of a printing system 200 according to some examples. The printing system 200 may include a multi-mode printer. For example, the printing system 200 may be to operate as an additive manufacturing system to generate three-dimensional objects, and as a two-dimensional printing system to generate images on a suitable substrate.

The printing system 200 may include a housing 202. The housing 202 may house various components, such as agent distributors and other components, as will be discussed in more detail.

The housing 202 may include side housing portions 204, a central housing portion 206, and a back housing portion 208. Surfaces of these housing elements may define a supply receiver 212 comprising a receiving volume. FIG. 2a shows the receiving volume 212 having a cuboid shape, but in other examples the receiving volume 212 may have other shapes depending on the configuration and shapes of the side housing portions 204, a central housing portion 206, and a back housing portion 208. As shown in FIG. 2a, the central housing portion 206 and the receiving volume 212 may extend to a sufficient length along the y-axis direction such that the printing system 200 may be considered a wide-format system. In other examples, the central housing portion 206 and the receiving volume 212 may have shorter or longer lengths along the y-axis direction. Thus, in some examples, the printing system 200 may be a smaller desktop system.

The printing system 200 may include a system controller 256, which may include a processor 258 for executing instructions such as those described in the methods herein. The processor 258 may, for example, be a microprocessor, a microcontroller, a programmable gate array, an application specific integrated circuit (ASIC), a computer processor, or the like. The processor 258 may, for example, include multiple cores on a chip, multiple cores across multiple chips, multiple cores across multiple devices, or combinations thereof. In some examples, the processor 258 may include at least one integrated circuit (IC), other control logic, other electronic circuits, or combinations thereof.

The controller 256 may support direct user interaction. For example, printing system 200 may include user input devices coupled to the processor 258, such as a keyboard, touchpad, buttons, keypad, dials, mouse, track-ball, card reader, or other input devices. Additionally, the printing system 200 may include output devices coupled to the processor 258, such as a liquid crystal display (LCD), printer, video monitor, touch screen display, a light-emitting diode (LED), or other output devices. The output devices may be responsive to instructions to display textual information or graphical data.

The processor 258 may be in communication with a computer-readable storage medium 260 via a communication bus. The computer-readable storage medium 260 may include a single medium or multiple media. For example, the computer readable storage medium 260 may include one or both of a memory of the ASIC, and a separate memory in the controller 256. The computer readable storage medium 260 may be any electronic, magnetic, optical, or other physical storage device. For example, the computer-readable storage medium 260 may be, for example, random access memory (RAM), static memory, read only memory, an electrically erasable programmable read-only memory (EEPROM), a hard drive, an optical drive, a storage drive, a CD, a DVD, and the like. The computer-readable storage medium 260 may be non-transitory. The computer-readable storage medium 260 may store, encode, or carry computer executable instructions 262 that, when executed by the processor 258, may cause the processor 258 to perform any of the methods or operations disclosed herein according to various examples.

FIG. 2b-c are simplified perspective views of a removable supply module 214 to be used for three-dimensional or two-dimensional printing according to some examples. The supply module 214 may include a housing 216. Wheels 218 may be attached to a bottom surface of the housing 216 such that the supply module 214 may be rolled as a trolley. In some examples, fixed legs may be provided rather than wheels. In some examples no wheels 218 or legs may be attached. A cover 222 may be removably coupled to the housing 216 to form part of the top surface of the supply module 214. When the cover 222 is removed, as shown in FIG. 2b, a supply assembly 224, which may be contained in the housing 216, may be exposed. FIG. 2c shows the cover attached. The housing 216 and cover 222 may prevent build material or substrate from unintentionally escaping from the supply module 214.

As shown in FIG. 2c, the supply assembly 224 may be removable as a drawer from the housing 216 by a user using a handle 220 attached to a side surface of the supply assembly 224. Additional handles may be provided on the surface of the supply assembly 224. In other examples, an automatic and/or electronic mechanism may be used to open the drawer automatically when, for example, a user provides input such as pressing a button on the housing 216, supply assembly 224, or on the printing system 200.

FIG. 2d is a simplified perspective view of a supply assembly 224 of a supply module 214 according to some examples. As shown, the supply assembly 224 has been fully removed from the housing 216. The supply assembly 224 may include a print chamber 228, and a supply chamber 226 to hold build material for three-dimensional printing.

A support member 230 may be provided in the supply chamber 226. A piston 232 may be attached to a bottom surface of the support member 230. A motor 234 may drive the piston 232 to cause the support member 230 to be movable along the z-axis. Similarly, a support member 236 may be provided in the print chamber 228. A piston 238 may be attached to a bottom surface of the support member 236. A motor 240 may drive the piston 238 to cause the support member 236 to be movable along the z-axis. In one example the support members 230 and 236 may have dimensions in the range of from about 10 cm by 10 cm up to 100 cm by 100 cm. In other examples the support members 230 and 236 may have larger or smaller dimensions.

Turning back to FIG. 2a, a fastener member 252 may be attached to the housing 216 at the bottom surface of the central housing portion 206. Alternatively or additionally, fastener members may be attached the side housing portions 204 and/or the back housing 208. In FIG. 2a, the fastener member 252 is shown longitudinally extending along the length of the central housing portion 206, but in other examples the fastener member 252 may have other configurations. In some examples, multiple separate fastener member 252 may be provided at different points along the length of the bottom surface of the central housing portion 206.

Turning back to FIG. 2b, a fastener member 254 may be attached to the top surface of the housing 216. Alternatively or additionally, fastener members may be attached to any other surfaces of the housing 216, including any of the four side surfaces. In FIG. 2b, the fastener member 254 is shown longitudinally extending along the length of the housing 216, but in other examples the fastener member 254 may have other configurations. In some examples, multiple separate fastener members 254 may be provided at different points along the length of the top surface of the housing 216.

Together, the fastening members 252 and 254 may be coupled such that the printing system 200 can removably couple to and removably receive the supply module 214 in the receiving volume 212. As shown, the supply module 214 may be received laterally or generally laterally, e.g. horizontally or generally horizontally, into the receiving volume 212. The fasteners 252 and 254 may be magnetic fasteners, mechanical fasteners, and/or other types of fasteners.

When the supply module 214 is inserted in the receiving volume 212 of the printing system 200, the cover 222 is intended to be removed such that components in the system such as agent distributors, energy sources, heaters, and sensors may be able to interact with the print chamber 228 and any build material therein, as will be discussed.

FIG. 2e is a simplified cross-sectional side view of the supply assembly 224 suitable for three-dimensional printing according to some examples. In FIG. 2e, the supply assembly 224 is shown being used for three-dimensional printing to generate a three-dimensional object. FIG. 2e shows build material 246 in storage on the top surface of the support member 230 in the supply chamber 226. FIG. 2e also shows a previously deposited layer 248 of build material on the top surface of the support member 238 in the print chamber 228. The previously deposited build material 248 includes a portion 250 that has been processed and solidified into part of a three-dimensional object using the printing system 200.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

In FIG. 2e, the supply assembly 224 may include a distributor 242. The distributor 242 may, for example, be a build material distributor such as, e.g., a wiper blade or a roller. The distributor 242 may be driven by a motor 244 to provide, e.g. deliver and/or deposit, successive layers of build material from the support member 230 in the supply chamber 226 to the support member 236 in the supply chamber 228. However, in other examples, the distributor 242 may instead be a component of the printing system 200 and attached to or in the housing 202. In some examples, distributors 242 may provide pneumatic or hydraulic transport of build material, wherein such build material distributors may be driven by motors.

FIG. 2f is a simplified cross-sectional side view of a supply assembly 282 suitable for two-dimensional printing according to some examples. The supply assembly 282 may be insertable and removable into a housing 216 of a supply module 214, in a similar way as the supply assembly 224 may be insertable and removable into the housing 216. Thus, the supply assembly 282 may be removable as a drawer from the housing 216 by a user using a handle 284 attached to a side surface of the supply assembly 282. Additional handles may be provided on the surface of the supply assembly 282. In other examples, an automatic and/or electronic mechanism may be used to open the drawer automatically when, for example, a user provides input such as pressing a button on the housing 216, supply assembly 282, or on the printing system 200.

As shown, the supply assembly 282 has been fully removed from the housing 216. The supply assembly 282 may include a print chamber 286, and a tray 288 to hold a substrate received from the print chamber 286 once an image is generated on the substrate. A support member 290 may be provided in the print chamber 286. A piston 292 may be attached to a bottom surface of the support member 290. A motor 294 may drive the piston 292 to cause the support member 290 to be movable along the z-axis. In one example the support member 290 and the tray 288 may each have dimensions in the range of from about 10 cm by 10 cm up to 100 cm by 100 cm. In other examples the support member 290 and the tray 288 may have larger or smaller dimensions.

FIG. 2f shows the supply assembly 224 being used for two-dimensional printing to generate images on substrates. FIG. 2f shows positioned substrates 253 on the top surface of the support member 290 in the print chamber 286. FIG. 2f also shows substrates 255 on the tray 288. The substrates 255 may have had images generated thereon in the print chamber 286 prior to being received on the tray 288.

In some examples, the substrates 251 and 253 may include any substrate on which images may be generated. For example, the substrates 251 and 253 may include sheets of substrate, or may include a webs, or rolls, of substrate. In some examples, the substrates 251 and 253 may include paper, photo media, or any other suitable substrate. In the example shown in FIG. 2f, the substrates 251 and 253 are shown as stacks of sheets of paper.

The supply assembly 282 may include a distributor 296. The distributor 296 may be any substrate distributor such as, e.g., a feed mechanism. The distributor 296 may be driven by a motor 298 to provide, e.g. feed, substrate 253 from the support member 290 in the supply chamber 286 to the tray 288 once images have been generated on the substrate, such that the print job may continue on additional substrate in the print chamber 286. In some examples, the distributor 296 may instead be a component of the printing system 200 and attached to or in the housing 202. Other types of distributors 296 may also be used.

In some examples, different configurations of supply modules and/or supply assemblies may be used. Additionally, supply modules may have any length along the x-axis direction or y-axis direction. Thus, in some examples, multiple supply modules may be simultaneously insertable in the receiving volume 212. These multiple modules may have the same size or may have different sizes, such as different lengths in the y-axis direction.

Although the examples of FIGS. 2b-2f illustrate removable supply modules, in other examples the supply modules may be integral parts of the printing system 200. Thus, it is understood herein that supply modules when recited by the claims are meant to be either removable or integral modules, unless specified to be one of removable or integral.

FIG. 2g is a simplified perspective view of the printing system 200 having received removable supply modules 214a-c according to some examples. Each of the supply modules 214a-c may be similar to the supply module 214. Thus, the printing system 200 may be to receive multiple supply modules 214a-c at a time. The supply module 214a may have a supply assembly 224 and thus may be for three-dimensional printing, and the supply module 214b may have a supply assembly 282 and thus may be suitable for two-dimensional printing. As shown, the tray 288 may be exposed through an opening in the supply assembly 224 such that substrates on which images have been generated may be retrieved by a user even if the printing system 200 is in operation. The additional supply module 214c may be any additional type of module, such as for three-dimensional or two-dimensional printing. However, in FIG. 2g, the supply module 214c is shown having supply assembly 224 and thus may be suitable for three-dimensional printing. In some examples, fewer or greater number of modules may be inserted into the printing system 200, and the modules may have different sizes. For example, multiple supply modules may be inserted for three-dimensional printing and multiple supply modules may be inserted for two-dimensional printing at the same time.

FIG. 2h is a simplified overhead view of the removable supply modules 214a-b and agent distributors 268 and 274 according to some examples. As shown, supply module 214a is for three-dimensional printing to generate a three-dimensional object, and may include the supply assembly 224 such as that shown in FIG. 2e. Additionally, as shown, supply module 214b is for two-dimensional printing to generate an image on a substrate, and may include the supply assembly 282 such as that shown in FIG. 2f. For simplicity, the additional supply module 214c is not shown in FIG. 2h.

In some examples, the supply modules 214, and 214a-c, may each include a controller and computer-readable medium having similar features as the controller 256 and computer-readable medium 260 described earlier. In such examples, the computer-readable medium may store data and/or instructions specifying features of the supply module, for example its size, the size of each of its chambers, whether the supply module is for three-dimensional printing or two-dimensional printing, the type of build material or substrate stored provided in its supply chamber, and the like. These data and/or instructions may be stored for access by the controller 256 when the supply module is inserted in the printing system 200 for printing. In some examples, an input device, having similar features as the input devices of the controller 256 discussed earlier, on the supply module may receive input from a user regarding the type of build material or substrate stored in the supply module. In some examples, a sensor on the supply module may automatically detect the type of build material or substrate.

Turning to FIGS. 2a and 2h, the printing system 200 may include agent distributors 268 and 274 to selectively deliver agents to substrates 253 provided in support members 290 in print chambers 286, and/or to successive layers of build material 248 provided on support members 236 in print chambers 228.

Various printing agents may be used. For example, fluids such as inkjet ink formulations may be used. According to one non-limiting example, a suitable agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. Examples of inks comprising visible light enhancers are dye based colored ink and pigment based colored ink, such as inks commercially known as CM993A and CE042A available from Hewlett-Packard Company. In some examples, the agent may further include suitable colorants, such as pigments or dyes, which may or may not serve as light absorbers. In some examples, inks may be curable through application of energy, such as UV energy.

The printing agents may be suitable for use both as coalescing agents to be delivered to build material to generate a three-dimensional object, and also as a printing agent to be delivered to a substrate to generate an image on a substrate. Thus, for example, each of the agent distributors 268 or 274 may be used to print in both the supply modules 214a-b. For example, one of the agent distributors 268 may be used to print one type of printing agent in the supply modules 214a-b, and the other of the agent distributors 268 may be used to print another, different type of printing agent, such as a different colored agent, in the supply modules 214a-b. In other examples, both agent distributors 268 and 274 may deliver the same agent, and may both print on both of the supply modules 214a-b. In other examples, for each agent distributor 268 and 274, some nozzles of the agent distributor (e.g. some rows of nozzles) may be used to print one type of printing agent such as an agent suitable for two-dimensional printing, while other nozzles in the same agent distributor (e.g. other rows of nozzles) may be used to print another type of printing agent such as an agent suitable for three-dimensional printing.

In some examples, rather than the same type of agent being usable for both three-dimensional and two-dimensional printing, some types of printing agents may be used as coalescing agents for three-dimensional printing, and other, different types of agents may be used as printing agents for two-dimensional printing. Thus, for example, one agent distributor 268 may deliver coalescing agent suitable for three-dimensional printing in the supply module 214a, and another agent distributor 274 may deliver printing agent suitable for two-dimensional printing in the supply module 214b.

The controller 256 may control the selective delivery of agents in accordance with instructions comprising agent delivery control data 266 stored in the computer-readable medium 260.

The agent distributors 268 and 274 may be printheads, such as a thermal inkjet printheads or a piezo inkjet printheads. The printheads may have arrays of nozzles. In one example, printheads such as those commonly used in commercially available inkjet printers may be used. In some examples, rather than printheads, the agent distributors may comprise spray nozzles, or any other types of agent distributors used in printing systems, including additive manufacturing systems and two-dimensional printing systems. Other delivery mechanisms may be used as well.

The agent distributors 268 and 274 may be used to selectively deliver, e.g. deposit, agent when in the form of suitable fluids such as liquids. In some examples, the agent distributors 268 and 274 may be selected to deliver drops of agent at a resolution of between 300 to 1200 dots per inch (DPI), for example 600 DPI. In other examples the agent distributors 268 and 274 may be selected to be able to deliver drops of agent at a higher or lower resolution. In some examples, the agent distributors 268 and 274 may have respective arrays of nozzles through which the agent distributors 268 and 274 are able to selectively eject drops of fluid. In some examples, each drop may be in the order of about 10 pico liters (pl) per drop, although in other examples agent distributors 268 and 274 that are able to deliver higher or lower drop sizes may be used. In some examples, agent distributors 268 and 274 that are able to deliver variable size drops may be used.

In some examples, the agent distributors 268 and 274 may be integral parts of the printing system 200. In some examples, the agent distributors 268 and 274 may be user replaceable rather than fixed, in which case the may be removably receivable, e.g. insertable, into suitable agent distributor receivers, e.g. interface module, of the printing system 200.

In the examples of FIG. 2a and FIG. 2h, the agent distributors 268 and 274 have lengths in the x-axis direction that enables them to span the whole width in the x-axis direction of the support members 236 and 290 of the supply modules 214a-c in a so-called page-wide array configuration. In one example this may be achieved through a suitable arrangement of multiple printheads. In other examples a single printhead having an array of nozzles having a length to enable them to span the width of the support members 236 and 290 may be used. In other examples, the agent distributors 268 and 274 may have shorter lengths that do not enable them to span the whole width of the support members 236 and 290.

The agent distributors 268 and 274 may be mounted on a moveable carriage to enable them to move bi-directionally across the entire length of the series of support members 236 along the illustrated y-axis, as shown by arrows 270 in FIG. 2a. This enables selective delivery of agents across the whole width and length of the support members 236 and 290 of the supply modules 214a-c in a single pass.

It should be noted that the term 'width' used herein is used to generally denote the shortest dimension in the plane parallel to the x and y axes illustrated in FIGS. 2a-h, whilst the term 'length' used herein is used to generally denote the longest dimension in this plane. However, it will be understood that in other examples the term 'width' may be interchangeable with the term 'length'. For example, in other examples the agent distributors 268 and 274 may have a length that enables them to span the whole length of the support members 236a and 290 whilst the moveable carriage may move bi-directionally across the width of the support members 236 and 290.

In another example the agent distributors 268 and 274 do not have a length that enables them to span the whole width of the support members 236 and 290 but are additionally movable bi-directionally across the width of the support members 236 and 290 in the illustrated x-axis. This configuration enables selective delivery of agents across the whole width and length of the support members 236 and 290 using multiple passes. Other configurations, however, such as a page-wide array configuration, may enable faster printing.

The agent distributors 268 and 274 may include supplies of agent or may be connectable to separate supplies of coalescing agent.

In some examples, there may be additional agent distributors. In some examples, the distributors of printing system 200 may be located on the same carriage, either adjacent to each other or separated by a short distance. In other examples, two or more carriages each may contain distributors. For example, each distributor may be located in its own separate carriage. Any additional distributors may have similar features as those discussed earlier with reference to the agent distributors 268 and 274. However, in some examples, different agent distributors may deliver different agents, for example.

The printing system 200 may additionally include an energy source 272 attached to the housing 202. The energy source 272 may be to apply energy to build material to cause the solidification of portions of the build material according to where coalescing agent has been delivered or has penetrated. The energy source 272 may also be to cure or dry printing agent deposited on a substrate, including printing agents such as UV curable inks, or inks curable or dryable using other types of energy.

In some examples, the energy source 272 is an infra-red (IR) radiation source, near infra-red radiation source, ultra-violet (UV) radiation source, or halogen radiation source. In some examples, the energy source 272 may be a single energy source that is able to uniformly apply energy to build material or substrate on the support members 236 and 290. In some examples, the energy source 272 may comprise an array of energy sources.

In some examples, the energy source 272 is to apply energy in a substantially uniform manner to the whole surface of a substrate or a layer of build material. In these examples the energy source 272 may be said to be an unfocused energy source. In these examples, a whole layer may have energy applied thereto simultaneously, which may help increase the speed at which a three-dimensional object may be generated.

In other examples, the energy source 272 is to apply energy in a substantially uniform manner to a portion of the whole surface of substrate or a layer of build material. For example, the energy source 272 may be to apply energy to a strip of the whole surface of a substrate or a layer of build material. In these examples the energy source may be moved or scanned across the substrate or the layer of build material such that a substantially equal amount of energy is ultimately applied across the whole surface of the substrate or the layer of build material.

In some examples, the energy source 272 may be mounted on the moveable carriage.

In other examples, the energy source 272 may apply a variable amount of energy as it is moved across the substrate or the layer of build material. For example, the controller 210 may control the energy source to apply energy selectively to portions of build material on which coalescing agent has been applied, and portions of substrate on which printing agent has been applied.

In further examples, the energy source 272 may be a focused energy source, such as a laser beam. In this example the laser beam may be controlled to scan across the whole or a portion of a substrate or a layer of build material. In these examples the laser beam may be controlled to scan across a substrate or a layer of build material in accordance with agent delivery control data. For example, the laser beam may be controlled to apply energy to those portions on which printing agent is delivered.

In some examples, when applying energy, the energy source 272 may, for example, be oriented such that energy is applied to build material 248, but not applied to substrate 253, because the agent on substrate 253 may, in some examples, not require curing. However, in other examples, the printing agent applied to the substrate 253 may be curable using the energy source 272. In other examples, the build material 248 may not require application of energy, for example if the printing agent delivered to build material 248 is a liquid binder.

In some examples, the printing system 200 may additionally include a heater or pre-heater to emit heat to maintain build material or substrate deposited on support members 236 and 290 within a predetermined temperature range. The heater may have an array of heating units. The heating units may each be any suitable heating unit, for example a heat lamp such as an infra-red lamp. The configuration may be optimized to provide a homogeneous heat distribution toward the area spanned by the build material. Each heating unit, or groups of heating units, may have an adjustable current or voltage supply to variably control the local energy density applied to the build material surface.

FIG. 3 is a flow diagram illustrating a method 300 of generating a three-dimensional object and generating an image on a substrate according to some examples. In some examples, the orderings of the elements may be varied, some elements may occur simultaneously, some elements may be added, and/or some elements may be omitted. In describing FIG. 3, reference will be made to FIGS. 2a-h, 4a-d, and 5a-b. FIGS. 4a-d show a series of cross-sectional side views of layers of build material according to some examples. FIGS. 5a-b show a series of cross-sectional side views of substrates according to some examples.

At 302, computer-readable media on supply modules 214a-c may store supply module data representing supply module features such as the type of build material or substrate being used, for example based on user input or detection by a sensor. Other features of the supply module, such as physical dimensions of the supply module, may be pre-stored on the computer-readable medium, as discussed earlier.

At 304, supply modules 214 may be received by, e.g. inserted into, the printing system 200. Various combinations of supply modules may be inserted. In the example of FIG. 2g, supply modules 214a-c including those for both three-dimensional and two-dimensional printing may be received.

At 306, the controller 210 may obtain and/or generate agent delivery control data 208. The agent delivery control data 208 may define at which portions or locations of build material or substrate that agents are to be delivered.

In some examples, if one of the inserted supply modules, such as supply module 214a, is for three-dimensional printing, the agent delivery control data 208 may define for each slice of the three-dimensional object to be generated the portions or the locations on build material on the support member 236 of the supply module 214a, if any, at which coalescing agents are to be delivered. Such agent delivery control data 208 may also depend on the location of the receiving volume along the y-axis in which the supply module 214a was inserted. The agent delivery control data 208 may be derived by a suitable three-dimensional object processing system in or outside of the printing system 200. In some examples, the agent delivery control data 208 may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified. The object property data may define properties of the object such as density, surface roughness, strength, and the like.

Additionally, in some examples, if one of the inserted supply modules, such as supply module 214b, is for two-dimensional printing, the agent delivery control data 208 may also define for each image to be generated the portions or the locations on substrate on the support member 236 of the supply module 214b, if any, at which printing agents are to be delivered. Such agent delivery control data 208 may also depend on the location of the receiving volume along the y-axis in which the supply module 214b was inserted. The agent delivery control data 208 may be derived by a suitable two-dimensional image processing system in or outside of the printing system 200.

At 308, a layer of build material may be provided for three-dimensional printing in a supply module for three-dimensional printing, and/or a substrate may be provided for two-dimensional printing. The delivery may be based on the data and/or instructions regarding features of the supply module stored in the computer-readable media of the supply modules.

In some examples, a layer 276 of build material may be provided on the support member 236 of the supply module 214a, as shown in FIG. 4a. For example, the controller 210 may control the distributor 242 to provide the layer 276 on a previously completed layer 248 shown in FIGS. 2e, 2h, and 4a. The completed layer 248 may include a solidified portion 250. Although a completed layer 248 is shown in FIGS. 4a-d for illustrative purposes, it is understood that 308 to 312 may initially be applied to generate the first layer 248.

In some examples, such as if the supply assembly 224 is used, the layer 276 may be delivered as follows. With reference to FIGS. 2e and 4a, the support member 230 in the supply chamber 226 may be positioned by the piston 232 in the z-axis direction in such a way that a portion of the stored build material 246 extends beyond the top edge of the supply assembly 224. The support member 236 in the print chamber 228 may be positioned by the piston 236 in the z-axis direction in such a way that a predetermined gap is provided above the previously deposited layer 248 of build material. The distributor 242 may then move longitudinally in the x-axis direction to roll the extended portion of the stored build material 246 into the predetermined gap to create the new layer 276 in the print chamber 228.

Additionally, in some examples, a substrate 257 may be provided on the support member 290 of the supply module 214b, as shown in FIG. 5a. For example, the controller 210 may control the distributor 242 to provide the substrate 257, such as a sheet of paper, on a substrate 253, such as a sheet of paper, having portions 255 on which images have already been generated as shown in FIGS. 2f and 2h. Although the substrate 253 is shown having images thereon for illustrative purposes, it is understood that 308 to 312 may initially be applied to generate the images on the substrate 253.

In some examples, such as if the supply assembly 282 is used, the substrate 257 may be positioned as follows. With reference to FIGS. 2f and 5a, the support member 290 in the supply chamber 286 may be positioned by the piston 292 in the z-axis direction in such a way that the substrate 257 in a suitable location to receive printing agent from the agent distributors.

At 310, agents may be selectively delivered to portions of the surfaces of the substrates and build materials in any supply modules in the printing system 200. This may be done using any of the techniques described earlier, such as using a single print pass e.g. if the agent distributors have a page-wide array configuration, or multiple print passes e.g. if the agent distributors do not have a page-wide array configuration. As discussed earlier in examples, one of the agent distributors 268 or 274 may be used to print in both the supply modules 214a-b. In other examples, both agent distributors 268 and 274 may deliver the same agent, and may both print on both of the supply modules 214a-b in a single or multiple passes. In other examples, some nozzles of each agent distributor 268 and 274 may deliver one type of printing agent, and other nozzles of each agent distributor 268 and 274 may deliver another, different type of printing agent. In other examples, one agent distributor 268 may deliver coalescing agent suitable for three-dimensional printing in the supply module 214a, and another agent distributor 274 may deliver printing agent suitable for two-dimensional printing in the supply module 214b.

In some examples, coalescing agent 278 may be selectively delivered to portions of the surface of the layer 276 of build material, as shown in FIG. 4b. The selective delivery of the coalescing agent 278 may be performed in patterns on portions of the layer 276 that the agent delivery control data 208 may define to become solid to form part of the three-dimensional object being generated. FIG. 5c shows coalescing agent 278 having penetrated substantially completely into the layer 276 of build material, but in other examples, the degree of penetration may be less than 100%.

In some examples, printing agent 259 may be selectively delivered to portions of the surface of the substrate 257 of build material, as shown in FIG. 5b. The selective delivery of the printing agent 259 may be performed in patterns on portions of the substrate 257 that the agent delivery control data 208 may define to become an image on the substrate 257.

"Selective delivery" means that agent may be delivered to selected portions of a substrate or a layer of the build material in various patterns. The patterns may be defined by the agent delivery control data 208, and based on the data and/or instructions regarding features of the supply module stored in the computer-readable medium of the supply modules.

At 312, a predetermined level of energy may be temporarily applied to the layer 276 of build material and/or the substrate 257. In various examples, the energy applied may be infra-red or near infra-red energy, microwave energy, ultra-violet (UV) light, halogen light, ultra-sonic energy, or the like.

In some examples, the temporary application of energy may cause portions of the build material on which coalescing agent 278 has been delivered or has penetrated to heat up above the melting point of the build material and to coalesce. Upon cooling, the portions which have coalesced become solid and form part of the three-dimensional object being generated. As discussed earlier, one such portion 250 may have been generated in a previous iteration. The heat absorbed during the application of energy may propagate to the previously solidified portion 250 to cause part of portion 250 to heat up above its melting point. This effect helps create a portion 280 that has strong interlayer bonding between adjacent layers of solidified build material, as shown in FIG. 5d.

In some examples, the temporary application of energy may cause portions of the build material on which printing agent 259 has been delivered to be cured or dried, as discussed earlier. However, in some examples, the printing agent 259 may not require curing or drying.

After a substrate and/or a layer of build material has been processed as described above, (1) a new layer of build material may be provided on top of the previously processed layer of build material in supply module 214a, such that the previously processed layer acts as a support for a subsequent layer of build material, and/or (2) the processed substrate may be fed to the tray 288 such that a new substrate may be exposed in the print chamber 286 in supply module 214b such that agent may be delivered to the newly exposed substrate. The process of blocks 308 to 312 may then be repeated to generate a three-dimensional object layer by layer, and to generate images on a plurality of substrates. For example, each iteration of blocks 308 and 312 may involve processing of one layer and one substrate.

Additionally, at any time during blocks 308 to 312, additional supply modules 214 may be received by the printing system 200 such as at block 304. Thus, while the method 300 is iterating through blocks 308 to 312, a parallel instance of the method 300 may proceed, such that the printing system 200 may be performing multiple print jobs at once on different supply modules 214. In other examples, immediately after the first instance of the method 300 has completed and generated a three-dimensional object or completed a two-dimensional print job, the second instance of the method 300 may proceed with blocks 308 to 312 such that the second three-dimensional object and/or two dimensional print job is generated immediately after the first one is completed, with little or no time delay in between.

All of the features disclosed in this specification (including any accompanying claims, abstract and drawings), and/or any of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A printing system comprising:
an agent distributor to selectively deliver at least one printing agent onto a substrate on a first type of supply module and a layer of build material on a second type of supply module;
a controller to control the agent distributor to selectively deliver the at least one printing agent in patterns derived from data representing a slice of a three-dimensional object to be generated or representing an image to be generated on the substrate, wherein the controller is further to control the printing system to generate an image on the substrate in the first type of supply module and to generate a three-dimensional object in the second type of supply module;
a housing having a surface defining a receiving volume to removably receive the first type of supply module and to removably receive the second type of supply module, the first type of supply module comprising a feed mechanism to feed the substrate to the agent distributor for printing, the second type of supply module comprising a system to manage multiple stacked layers of build material; and wherein the second type of supply module includes a first print chamber to receive from a distributor successive layers of build material with which to generate the three-dimensional object, wherein the first type of supply module includes a second print chamber in which to position the substrate for generating the image on the substrate.

2. The printing system of claim 1 further comprising an energy source to apply energy to the layer to cause a portion of the build material to coalesce and to solidify to form a slice of the three-dimensional object in accordance with where the at least one printing agent was delivered onto the layer.

3. The printing system of claim 1 wherein the distributor comprises a printhead.

4. The printing system of claim 1 wherein the at least one printing agent comprises a same printing agent to be delivered to the substrate and to the layer of build material.

5. The printing system of claim 1 wherein the at least one printing agent comprises:
a first printing agent to be delivered onto the substrate; and
a second printing agent to be delivered onto the layer of build material.

6. The printing system of claim 1 wherein the agent distributor is to selectively deliver the first printing agent onto the substrate, and further comprising a second agent distributor to selectively deliver the second printing agent onto the substrate.

7. The printing system of claim 1 wherein the agent distributor, or a combination of multiple agent distributors in the printing system, has a page wide array configuration spanning a width of the substrate and of the layer of build material to enable delivery of the at least one printing agent to an entire area of the substrate and to an entire area of the layer in a single pass.

8. The printing system of claim 1 wherein the agent distributor, or a combination of multiple agent distributors in the printing system, does not have a page wide array configuration and does not span a width of the substrate and of the layer of build material, such that that agent distributor, or the combination of multiple agent distributors, is to deliver the at least one printing agent to an entire area of the substrate and to an entire area of the layer in multiple passes.

9. The printing system of claim 1 wherein the three-dimensional object and the image are to be generated during a same print job by the printing system.

10. The printing system of claim 1, further comprising a fastener to releasably fasten each of the first and second types of supply module to the system and in communication with the agent distributor.

11. The printing system of claim 1, further comprising a third supply module of either the first or second type in communication with the agent distributor.

12. The printing system of claim 1 wherein the second type of supply module comprises a supply chamber to hold the build material that is to be received in the first print chamber.

13. The printing system of claim 1 wherein each of the first and second types of supply modules includes a computer-readable medium storing respective supply module data representing whether the respective supply module is for three dimensional printing or two-dimensional printing, wherein the controller is to receive the supply module data.

14. The printing system of claim 1, the controller to control the printing system to perform multiple print jobs at once in different supply modules.

15. The printing system of claim 1 wherein the at least one printing agent comprises a same printing agent to be delivered to the substrate for receiving an image in a supply module of the first type and to the layer of build material in a supply module of the second type.

16. The printing system of claim 1, wherein the housing defines a receiving volume for multiple supply modules of either type or both types to be simultaneously inserted in the receiving volume.

17. The printing system of claim 16, the controller to control the printing system to perform two-dimensional printing in a first supply module of the first type and three-dimensional printing in a second supply module of the second type, with both the first and second supply modules being simultaneously present in the receiving volume.

* * * * *